United States Patent
Morikawa et al.

(10) Patent No.: US 8,094,248 B2
(45) Date of Patent: Jan. 10, 2012

(54) LIQUID CRYSTAL DISPLAY DEVICE

(75) Inventors: Takashi Morikawa, Kanagawa (JP);
Atsushi Hirano, Kanagawa (JP);
Hiroshi Arisawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 455 days.

(21) Appl. No.: 12/465,989

(22) Filed: May 14, 2009

(65) Prior Publication Data
US 2010/0123840 A1    May 20, 2010

(30) Foreign Application Priority Data
Nov. 20, 2008 (JP) ................. 2008-296377

(51) Int. Cl.
*G02F 1/137* (2006.01)

(52) U.S. Cl. ......................................... 349/23

(58) Field of Classification Search .................. None
See application file for complete search history.

(56) References Cited

U.S. PATENT DOCUMENTS 7,675,580 B2 * 3/2010 Rho ................. 349/12
2003/0043317 A1   3/2003 Cirkel et al.

FOREIGN PATENT DOCUMENTS

JP     A-2002-6280     1/2002
JP     A-2005-501294   1/2005

* cited by examiner

*Primary Examiner* — Hemang Sanghavi
(74) *Attorney, Agent, or Firm* — Oliff & Berridge, PLC

(57) ABSTRACT

A liquid crystal display device, having: a liquid crystal display medium that has a liquid crystal layer disposed between a pair of electrodes disposed facing with each other and that displays an image by reflecting or transmitting outside light according to the orientation of the liquid crystal layer; and an electrostatic actuator disposed at a side opposite to a display surface of the liquid crystal display medium, in which the liquid crystal display device displays an image by changing the orientation of the liquid crystal layer by application of a voltage to a specific area of the liquid crystal display medium through the pair of electrodes according to image data after the orientation of the liquid crystal layer is changed to the planar state by applying a stress to the liquid crystal display medium by the electrostatic actuator.

17 Claims, 7 Drawing Sheets

LIQUID CRYSTAL DISPLAY DEVICE

CROSS-REFERENCE TO RELATED APPLICATIONS

This application is based on and claims priority under 35 USC 119 from Japanese Patent Application No. 2008-296377 filed on Nov. 20, 2008.

BACKGROUND

1. Technical Field

The present invention relates to a liquid crystal display device.

2. Related Art

A medium (e.g., electronic paper) that has a cholesteric liquid crystal layer between a pair of electrodes and displays an image by reflecting or transmitting outside light while suitably changing, by applying a driving voltage, the orientation pattern of the cholesteric liquid crystal layer to a focal conic phase (F phase), a planar phase (P phase), or a homeotropic phase (H phase) has been proposed.

SUMMARY

According to an aspect of the invention, there is provided a liquid crystal display device including a liquid crystal display medium that has a cholesteric liquid crystal layer disposed between a pair of electrodes disposed facing each other and that displays an image by reflecting or transmitting outside light according to the orientation of the liquid crystal layer, and an electrostatic actuator disposed at a side opposite to a display surface of the liquid crystal display medium, wherein the liquid crystal display device displays an image by changing the orientation of the liquid crystal layer by application of a voltage to a specific area of the liquid crystal display medium through the pair of electrodes according to image data, after the orientation of the liquid crystal layer is changed to a planar state by applying a pressure to the liquid crystal display medium by the electrostatic actuator.

BRIEF DESCRIPTION OF THE DRAWINGS

Exemplary embodiments of the present invention will be described in detail based on the following figures, wherein:

FIGS. 1A to 1C are views schematically illustrating orientations of a cholesteric liquid crystal, in which FIGS. 1A to 1C illustrates the following orientation states: FIG. 1A illustrates a planar phase; FIG. 1B illustrates a focal conic phase; and FIG. 1C illustrates a homeotropic phase;

DETAILED DESCRIPTION

Figure 1A:
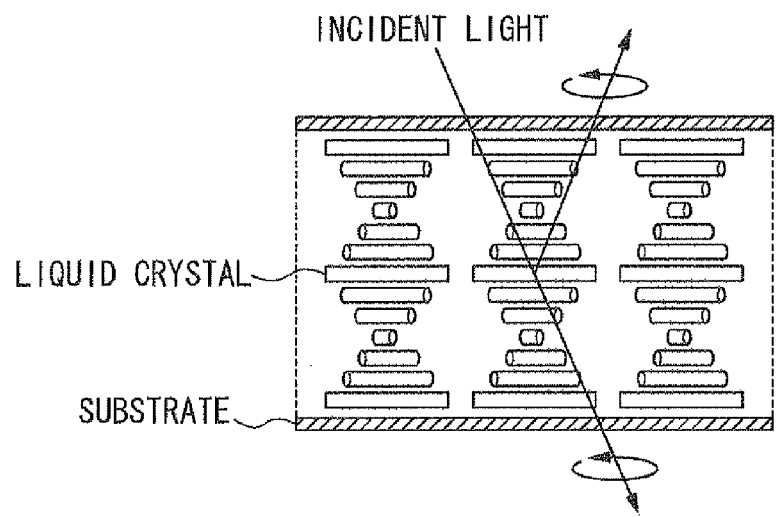

Hereinafter, exemplary embodiments will be specifically described with reference to the accompanying drawings. Herein, members having substantially the same functions and actions are designated by the same reference numerals throughout the drawings or the reference numerals are omitted, and duplicative descriptions are suitably omitted.

Figure 1B:
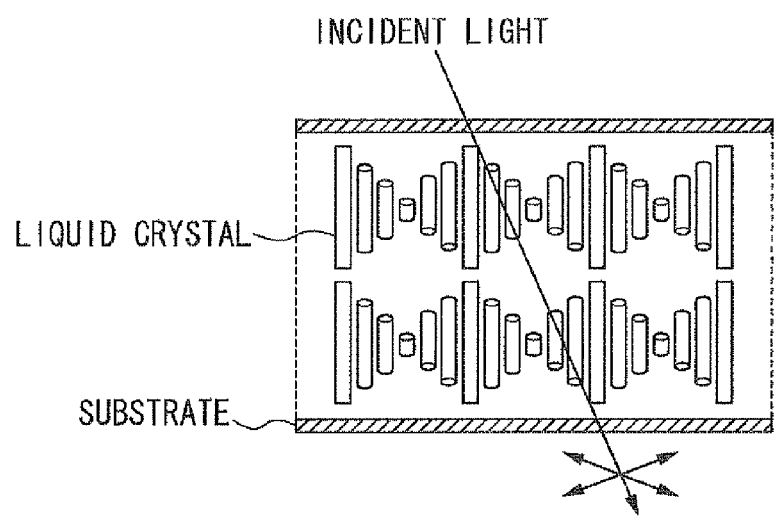
Figure 1C:
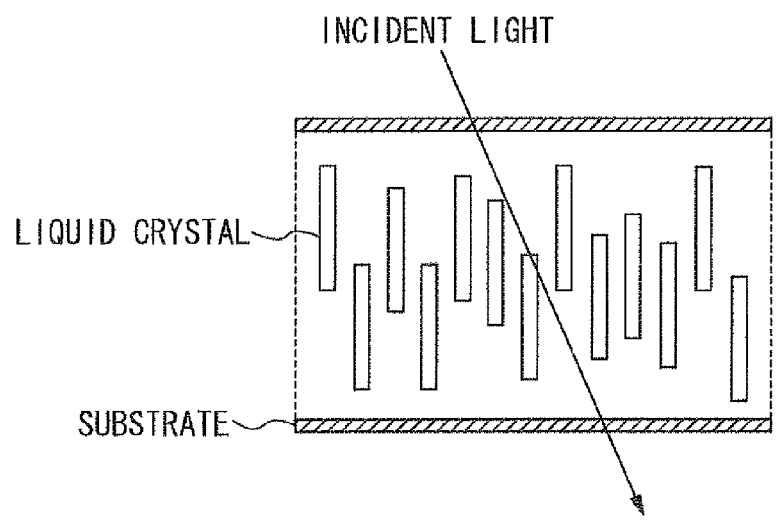

First, the orientation properties of a cholesteric liquid crystal will be described. FIGS. 1A to 1C schematically illustrate orientations of a cholesteric liquid crystal. The cholesteric liquid crystal has a structure in which liquid crystal molecules are aligned in layers and the respective layers are twisted into a spiral (a helix). A specific part of light incident in the helical axis direction of the cholesteric liquid crystal layer having a helical structure is selectively reflected (Bragg reflected) according to the helical pitch, and the orientation of the liquid crystal is changed according to the strength of an electric field, thereby changing the reflectivity thereof. Specifically, the following three states are indicated a planar phase (FIG. 1A) in which the helical axis becomes substantially perpendicular to the cell surface, and light having a specific wavelength from the incident light is selectively reflected; a focal conic phase (FIG. 1B) in which the helical axis becomes substantially parallel to the cell surface, and incident light is transmitted with a forward scattering; and a homeotropic phase (FIG. 1C) in which the helical structure is unraveled, and incident light is almost completely transmitted.

In general, in a reflection type liquid crystal display device using such a cholesteric liquid crystal, the orientation is changed to the planar orientation by applying a voltage equal to or higher than a threshold to achieve homeotropic orientation, and then quickly removing an electric field, and thus a reflected color corresponding to the helical pitch of the cholesteric liquid crystal is displayed. However, since this process passes through a stage of homeotropic orientation, it is necessary to use an expensive driving IC which has a high driving voltage, and the number of driving ICs dramatically increases together with increased demands for higher-definition displays, resulting in high costs. Moreover, there is also a problem in that, in the planar orientation achieved by application of an electric field, the reflectivity is low and the inherent reflectivity of the liquid crystal is not sufficiently utilized. Therefore, in order to obtain a sufficient reflectivity, the thickness of the liquid crystal layer needs to be increased, and as a result, the driving voltage increases. In contrast, when the state of a cholesteric liquid crystal layer is changed to a planar state by applying a pressure, the reflectivity can be increased, compared with the case in which the planar orientation is obtained by using an electric field.

Figure 2:
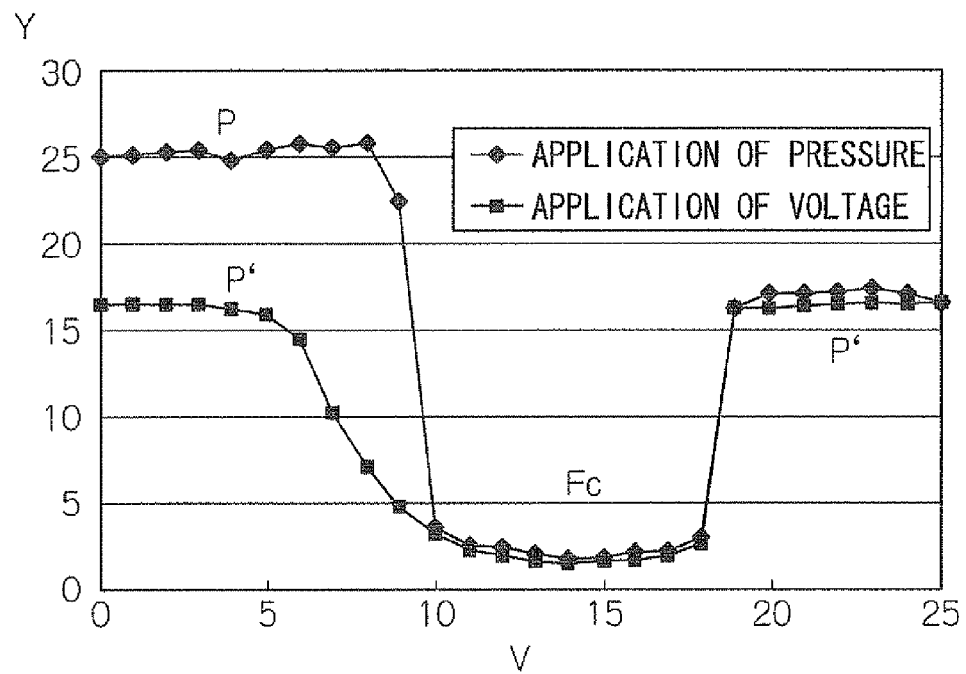
FIG. 2 is a view illustrating driving voltage-reflectivity characteristics when the thickness of a cholesteric liquid crystal layer is 2 μm.

FIG. 2 illustrates driving voltage-reflectivity characteristics when writing is performed by applying a voltage having a certain rectangular wave form for 300 ms after a cholesteric liquid crystal layer (thickness: 2 μm) is initialized by applying a pressure (characteristic curve obtained by connecting diamond plots) and after a cholesteric liquid crystal layer is initialized by applying a voltage (20 V) (characteristic curve obtained by connecting square plots). As shown in FIG. 2, the orientation of the cholesteric liquid crystal changes to a planar state (P) and then to a focal conic state (Fc) according to electric field strength, and then changes to a planar state (P') again when a voltage exceeds a voltage for a homeotropic state.

In general, when an image is written using only a voltage, an image is written by changing the orientation of a liquid crystal layer in a specific area from the homeotropic state to the planar state (P') or the focal conic state (Fc). Therefore, a driving voltage of at least about 20 V is required even when the thickness of the liquid crystal layer is reduced to be as thin as about 2 µm.

In contrast, when the state of the liquid crystal layer is changed to the planar state (P) by a pressure, a high reflectivity is obtained in the planar state, and the state is changed to the focal conic state (Fc) at about 10 V. More specifically, an image can be written by changing the whole liquid crystal layer to the planar state (P) by a pressure, and applying a voltage of about 10 V to a specific area according to image data so as to change the state to the focal conic state (Fc), thereby changing the reflectivity.

First Exemplary Embodiment

Figure 3:
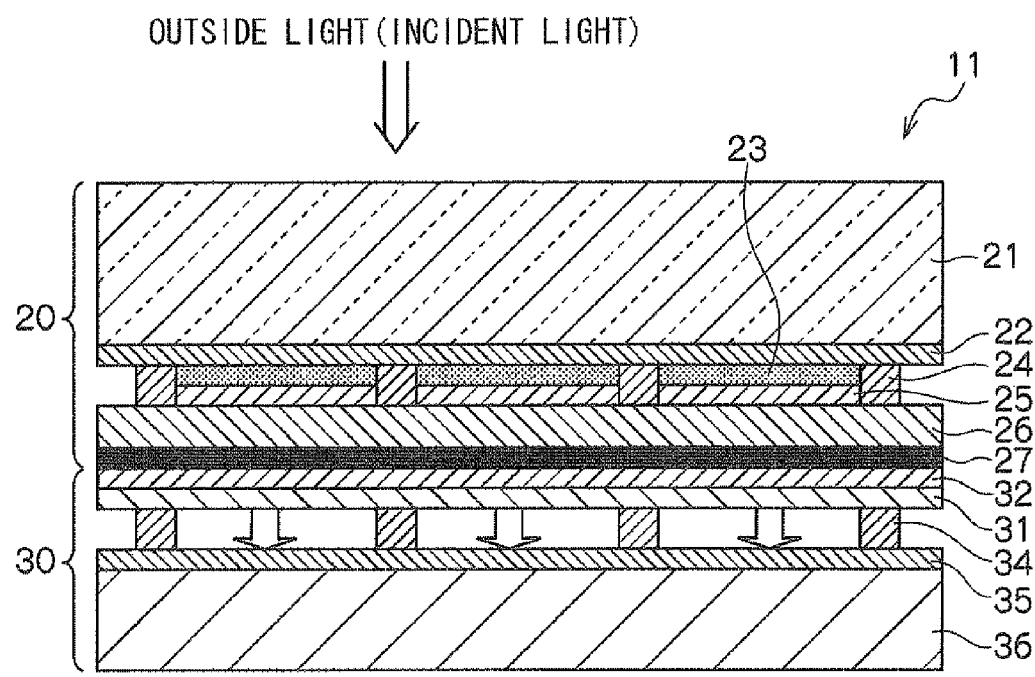
FIG. 3 is a schematic configuration diagram illustrating the structure of a liquid crystal display device according to a first exemplary embodiment.

FIG. 3 schematically illustrates a liquid crystal display device according to a first exemplary embodiment. A liquid crystal display device 11 according to this exemplary embodiment has a liquid crystal display medium 20 and an electrostatic actuator 30. The electrostatic actuator 30 is disposed at a side opposite to a display surface of the liquid crystal display medium 20 and is integrated with the liquid crystal display medium 20. In the liquid crystal display device 11 having such a structure, a stress is applied to a liquid crystal layer 23 of the liquid crystal display medium 20 by the electrostatic actuator 30 to change the state to the planar state, and then a voltage is applied to a specific area according to image data through a pair of electrodes 22 and 25 of the liquid crystal display medium 20 to change the orientation of the liquid crystal layer 23, whereby an image is displayed. Since the image is held under no power supply except for writing of the image, the image can be displayed at a low voltage.

(Liquid Crystal Display Medium)

Figure 4:
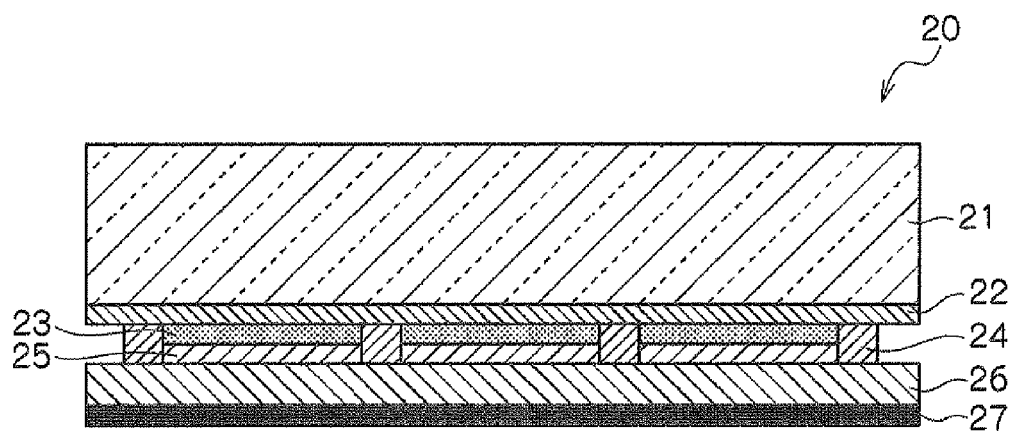
FIG. 4 is a schematic configuration diagram illustrating the structure of a liquid crystal display medium.

FIG. 4 schematically illustrates the structure of the liquid crystal display medium 20. In the liquid crystal display medium 20, two substrates 21 and 26 respectively having electrodes 22 and 25 formed at one side are disposed facing each other and the cholesteric liquid crystal layer (sometimes referred to as a "liquid crystal layer") 23 is disposed between the pair of electrodes 22 and 25. An image is displayed by reflecting or transmitting outside light (incident light) according to the orientation of the liquid crystal layer 23.

—Substrate—

The respective substrates 21 and 26 retain the liquid crystal layer 23 therebetween, and are formed of a sheet-shaped member having a strength which tolerates an external force.

Examples of a specific material forming the substrate 21 or 26 include an inorganic sheet (e.g., glass or a silicon substrate) and a polymer film (e.g., polyethylene terephthalate, polysulfone, polyether sulfone, polycarbonate, or polyethylene naphthalate). For example, when the liquid crystal display device according to this exemplary embodiment is used as an electronic paper, it is preferable that the substrates 21 and 26 have flexibility, and a polymer film is preferable.

The substrate 21 at the display surface side is a transparent substrate that transmits at least incident light and through which an image to be displayed according to the orientation of the liquid crystal layer 23 can be visually observed. In general, a transparent substrate having transmittance over the entire visible light region may be used. However, a transparent substrate having light transmittance only in a specific wavelength region to be displayed may be used. Known functional films, such as an antifouling film, an abrasion resistant film, a light-reflection preventing film, or a gas barrier film, may be formed on the outer surface of the substrate.

The thickness of the substrate 21 at the display surface side is, depending on the material, generally about 0.025 mm to about 2 mm in view of strength for protecting the liquid crystal layer 23 or the like, flexibility, etc.

In contrast, on the substrate 26 that is in contact with the electrostatic actuator 30 and provided at a non-display side, a light absorption layer 27 that absorbs light that has transmitted through the liquid crystal layer 23 is formed. The light absorption layer 27 is formed using a black color material, which has absorption over the entire visible wavelength region (400 to 700 nm), for example, a coating material containing a black pigment or a black dye, such as carbon black or aniline black, or an inorganic material, such as chrome oxide.

The thickness of the substrate 26 at the non-display side needs to be adjusted so that a stress by the electrostatic actuator 30 is transmitted to the liquid crystal layer 23, and the thickness of the substrate 26 is generally about 25 µm to about 200 µm, even though the thickness depends on the material or the like.

—Electrode—

The liquid crystal display device according to this exemplary embodiment is a passive-matrix type liquid crystal display device, in which the electrodes 22 and 25 having a stripe shape are formed on the substrates 21 and 26, respectively, so that one of the electrodes 22 and 25 serves as an anode and the other one of the electrodes 22 and 25 serves as a cathode. The stripe-shaped electrodes 22 and 25 are disposed crossing with each other and a voltage is applied to the liquid crystal layer 23 at a region where the electrode 22 crosses with the electrode 25. By applying a voltage to the liquid crystal layer 23 through the electrodes 22 and 25 in a specific area according to image data, the orientation changes, whereby the reflectivity to light having a specific wavelength changes.

Specific examples of the electrodes 22 and 25 include conductive thin films formed of metals (e.g., gold or aluminum), metal oxides (e.g., indium oxide, tin oxide, or indium tin oxide (ITO)), and conductive organic polymers (e.g., a polythiophene- or a polyaniline-conductive organic polymer). As the electrode at the display surface side, a transparent electrode that transmits at least incident light may be used. The transparent electrode may have transmittance over the entire visible light region or may have transmittance only in a wavelength region to be displayed. From the viewpoint of light transmittance, film formability, etc., an ITO electrode is preferable.

—Orientation Film—

On the electrodes 22 and 25, an orientation film (not shown) is formed. The orientation film is a film that aligns liquid crystal molecules in a given direction. In this exemplary embodiment, a vertical orientation film that changes the orientation of the liquid crystal layer 23 to the focal conic phase is provided. For the formation of the orientation film, resins, such as polyimide or polyvinyl alcohol, low molecular weight surface modifiers, such as an alkylammonium compound or an alkylsilane compound, inorganic thin films, such as SiO, etc., are used. For example, the vertical orientation film can also be formed by, for example, forming a film using a resin material, such as polyimide resin, on an electrode film, and then forming a channel in a given direction by rubbing.

—Partition Wall—

Between the upper and lower electrodes 22 and 25, partition walls (ribs) 24 that divide the liquid crystal layer 23 are formed. For example, when lattice-like partition walls 24 are formed between the upper and lower electrodes 22 and 25, each compartment of the liquid crystal layer 23 surrounded by partition walls 24 individually forms a pixel.

The partition walls 24 are formed by, for example, applying a negative resist or a positive resist to the orientation film formed on the transparent substrate 21, exposing the resist to a given pattern using a photomask, and developing the exposed resist.

—Liquid Crystal Layer—

The liquid crystal layer 23 is mainly formed of a cholesteric liquid crystal. The liquid crystal layer 23 is disposed between the electrodes 22 and 25 disposed facing each other while being divided by the partition walls 24. By changing the orientation of the liquid crystal layer 23 in a specific area, the reflection/transmission state of a light having a specific wavelength among incident lights is modulated. The selected orientation is held under no voltage application due to memory properties, which are properties of the cholesteric liquid crystal.

Examples of a specific liquid crystal usable as the cholesteric liquid crystal include liquid crystals in which a chiral agent (e.g., a steroid-based cholesterol derivative or a Schiff base-, azo-, ester-, or biphenyl-chiral agent) has been added to a nematic liquid crystal (e.g., a Schiff base liquid crystal or an azo-, azoxy-, benzoate-, biphenyl-, terphenyl-, cyclohexyl-carboxylate-, phenylcyclohexane-, biphenylcyclohexane-, pyrimidine-, dioxane-, cyclohexylcyclohexanate-, cyclohexylethane-, cyclohexane-, tolan-, alkenyl-, stilbene-, or condensed polycyclic-liquid crystal) or mixtures thereof.

The helical pitch of the cholesteric liquid crystal is adjusted by changing the amount of the chiral agent added to the nematic liquid crystal. For example, when blue, green, or red is displayed, the proportions of the nematic liquid crystal and the chiral agent may be adjusted so that the center wavelength of selective reflection is in the range of 400 nm to 500 nm, 500 nm to 600 nm, and 600 nm to 700 nm, respectively.

In order to compensate for temperature dependency of the helical pitch of the cholesteric liquid crystal, a known method involving adding plural chiral agents having different twist directions or exhibiting opposite temperature dependencies may be employed.

(Electrostatic Actuator)

Figure 5:
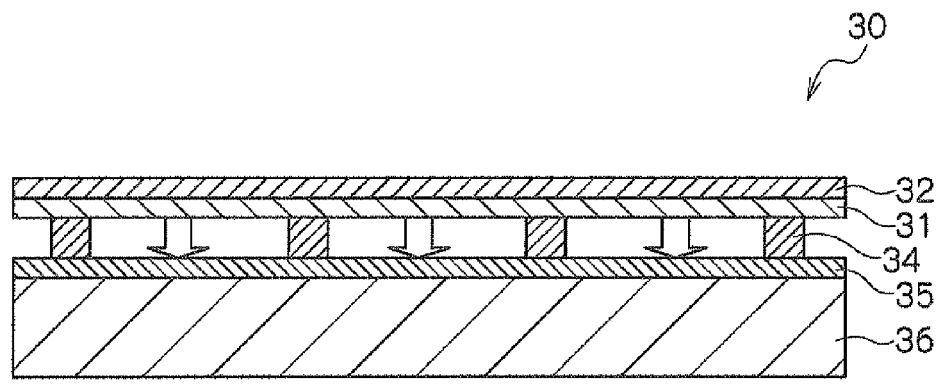
FIG. 5 is a schematic configuration diagram illustrating the structure of an electrostatic actuator.

FIG. 5 schematically illustrates the structure of the electrostatic actuator 30. The electrostatic actuator 30 according to this exemplary embodiment is an opposing flat plate type electrostatic actuator and is integrated with the liquid crystal display medium 20 at the back (side opposite to the display surface) of the display surface of the liquid crystal display medium 20. Electrodes 32 and 35 are formed on substrates 31 and 36, respectively, disposed facing each other. By applying a voltage between the electrodes 32 and 35, the upper substrate 31 deforms. Since the electrostatic actuator 30 is integrated with the liquid crystal display medium 20, a stress is applied to the liquid crystal display medium 20 in accordance with the deformation of the upper substrate 31 of the electrostatic actuator 30 to change the state of the liquid crystal layer 23 to the planar state.

—Substrate—

The upper substrate 31 of the electrostatic actuator 30 is structured in such a manner as to move up and down depending on whether or not voltage is applied between the electrodes 32 and 35. Examples of the upper substrate include polyvinylidene chloride, polyvinyl chloride, polyolefin chloride, and polyolefine in addition to the polymer materials mentioned as the material for forming the substrates 21 and 26 of the liquid crystal display medium 20. The thickness of the upper substrate 31 is, depending on the material, generally about 1 µm to about 25 µm so that the upper substrate 31 moves up and down to apply a stress to the liquid crystal display medium 20.

In contrast, the back substrate 36 hardly deforms even when a voltage is applied between the electrodes 32 and 35. Examples of a specific material thereof include the polymer materials mentioned as the material for forming the substrates 21 and 26 of the liquid crystal display medium. The thickness of the back substrate 36 is, depending on the material, generally about 50 µm to about 2 mm so as to prevent deformation when a voltage is applied.

—Electrode—

There is no limitation on the upper and lower electrodes 32 and 35 forming the electrostatic actuator 30 insofar as electrical conductivity is given. For example, the upper and lower electrodes 32 and 35 are formed of the same conductive materials as those of the electrodes 22 and 25 forming the liquid crystal display medium 20. In particular, an Al electrode is preferable from the viewpoint of electrical conductivity, film formability, etc. Since the electrostatic actuator 30 collectively applies a stress to the whole liquid crystal layer of the liquid crystal display medium 20, each of the upper and lower electrodes 32 and 35 is formed, as a common electrode, over one side of each of the substrates 31 and 36, respectively.

—Partition Wall—

Between the substrates 31 and 36 of the electrostatic actuator 30, partition walls 34 are formed at a position corresponding to the partition walls 24 that divide the liquid crystal layer 23 of the liquid crystal display medium 20. The "corresponding position" as used herein means that the partition walls 24 and 34 are present at the substantially same position on a plan view when viewed vertically from above the substrate 31. Specifically, the "corresponding position" as used herein refers to a position where, when a voltage is applied between the electrodes 32 and 35 of the electrostatic actuator 30, the substrates 31 and 26 at the center are not prevented from moving up and down due to the existence of a partition wall 24 of the liquid crystal display medium 20.

When the same mask as that used for forming the partition wall 24 of the liquid crystal display medium 20 is used, the partition wall 34 having the same pattern can be formed. As the material for forming the partition wall 34, a negative resist or a positive resist is mentioned. Air is enclosed in a space between the substrates 31 and 36 divided by the partition wall 34.

The partition walls 34 at the side of the electrostatic actuator 30 are not essential. However, when the partition walls 34 are provided also between the substrates 31 and 36 of the electrostatic actuator 30 so as to correspond to the partition walls 24 of the liquid crystal layer 23 of the liquid crystal display medium 20, a stress can be applied more uniformly to each compartment of liquid crystal layer 23 divided by the partition walls 24 at the side of the liquid crystal display medium 20 when a voltage is applied between the electrodes 32 and 35 of the electrostatic actuator 30, whereby the liquid crystal layer 23 can be thoroughly initialized (formation of a planar orientation) more certainly.

In the electrostatic actuator 30 structured as described above, electrostatic force is in inverse proportion to the square of the gap spacing. Therefore, an electrode spacing may be made small so as to obtain a great deal of power at a low voltage. For example, a stress generated by the electrostatic actuator 30 increases as the thickness of the upper substrate 31 is made thinner. In this exemplary embodiment, since the electrode 32 of the upper substrate 31 is disposed facing the liquid crystal display medium 20 and the upper substrate 31 is disposed between the electrodes 32 and 35, a short circuit between the electrodes 32 and 35 is prevented even when the upper substrate 31 moves up and down. However, a short circuit may be prevented by making the electrodes 32 and 35 of both the substrates 31 and 36 face each other and disposing an insulator between the electrodes 32 and 35.

A light absorption layer 27 side of the liquid crystal display medium 20 structured as described above and a surface of the electrostatic actuator 30 on which the upper electrode 32 is formed are bonded to each other via an adhesive layer (not shown). At this time, they are bonded to each other so that the position of the partition wall 24 of the liquid crystal display medium 20 and the position of the partition wall 34 of the electrostatic actuator 30 overlap each other. Thus, the reflection type liquid crystal display device 11 according to this exemplary embodiment is obtained. In the liquid crystal display device 11 according to this exemplary embodiment, a stress is applied to the liquid crystal layer 23 of the liquid crystal display medium 20 when the upper substrate 31 deforms by applying a voltage between the electrodes 32 and 35 of the electrostatic actuator 30, and the orientation of the liquid crystal layer 23 is changed to a planar orientation to reflect incident light, whereby white is displayed over an entire surface of the liquid crystal display medium 20.

Thus, the state of the entire liquid crystal layer 23 is reset to the planar state, by the electrostatic actuator 30, and then a voltage is applied to a specific portion between the electrodes 22 and 25 of the liquid crystal display medium 20 according to image data from an external unit, such as a main controller that controls the input/output of image data. In the liquid crystal layer 23 to which a voltage is applied, the liquid crystal state is changed from the planar orientation to the focal conic state. In the focal conic state, the screw axis of a spiral structure becomes substantially parallel to the substrate surfacer and incident light transmits through the liquid crystal layer 23. Accordingly, in a portion of the liquid crystal layer 23 which is in the focal conic state, incident light is transmitted through the liquid crystal layer 23 and absorbed into the light absorption layer 27, whereby a dark display (black display) is selectively obtained.

Thus, an image is displayed by changing the state of the liquid crystal layer 23 in a specific portion according to image data from the planar state to the focal conic state. When the thickness of the liquid crystal layer 23 is 2 μm, for example, the state thereof can be changed from the planar state to the focal conic state at a voltage as low as about 10 V. More specifically, the orientation of the liquid crystal layer 23 of the liquid crystal display medium 20 is changed to the planar orientation for initialization by the application of a stress by the electrostatic actuator 30, and then the state of the liquid crystal layer 23 of a specific portion is changed to the focal conic state based on the image data input from the outside, whereby an image is written at a low voltage.

Accordingly, for example, compared with a conventional liquid crystal display device that is driven only by an electric field applied between electrodes of a liquid crystal display medium in which a driving IC capable of outputting a driving voltage of about 40 V is required, the liquid crystal display device 11 according to this exemplary embodiment can be driven by a driving IC capable of outputting a driving voltage of about 10 V although a large voltage is sometimes required for driving the electrostatic actuator 30 depending on the structure. Thus, the cost can be dramatically reduced.

Second Exemplary Embodiment

Figure 6:
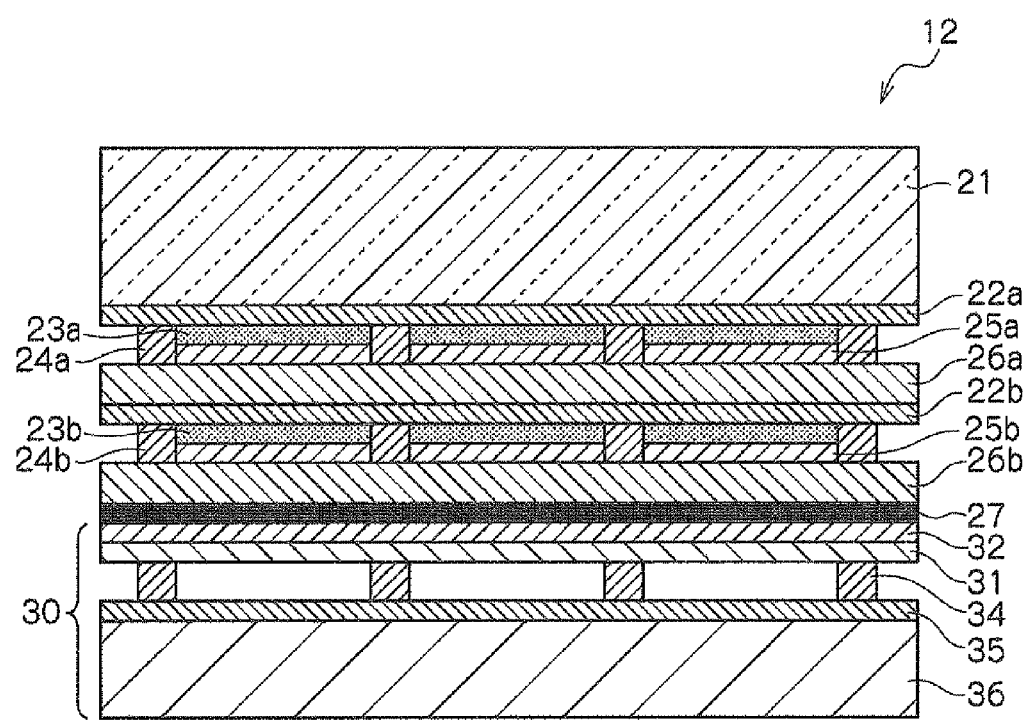
FIG. 6 is a schematic configuration diagram illustrating the structure of a liquid crystal display device according to a second exemplary embodiment.

FIG. 6 illustrates a liquid crystal display device according to a second exemplary embodiment. In a liquid crystal display device 12 according to this exemplary embodiment, a first liquid crystal layer 23a and a second liquid crystal layer 23b are disposed with a transparent substrate 26a therebetween in a liquid crystal display medium. One of the first and second liquid crystal layers is a levorotatory liquid crystal layer and the other one thereof is a dextrorotatory liquid crystal layer. The liquid crystal layers 23a and 23b are disposed between electrodes 22a and 25a or between 22b and 25b, respectively, and are respectively divided by partition walls 24a and 24b having corresponding patterns. The structure of the electrostatic actuator 30 is the same as that of the first exemplary embodiment.

The planar phase of the cholesteric liquid crystal divides light entering in parallel to the screw axis into dextrorotatory light and levorotatory light, and causes a selective reflection phenomenon in which a circularly polarized light component that accords the twist direction of the spiral undergoes Bragg reflection and the other light components are transmitted. Accordingly, in a dextrorotatory or levorotatory single-layered liquid crystal layer, almost half of the incident light is transmitted without being reflected.

In contrast, when the liquid crystal layers 23a and 23b, one of which is levorotatory while the other of which is dextrorotatory, form a multilayer structure as shown in FIG. 6, the reflectivity is improved when compared with the case of a single-layered liquid crystal layer. Therefore, a brighter display can be performed, and an improvement in contrast is also promoted. The liquid crystal layer 23a is driven by the electrodes 22a and 25a between which the liquid crystal layer 23a is sandwiched. Independently from the liquid crystal layer 23a, the liquid crystal layer 23b is driven by the electrodes 22b and 25b between which the liquid crystal layer 23b is sandwiched. Accordingly, the two liquid crystal layers 23a and 23b superposed within the same pixel are separately driven to change their orientations to different orientations from each other. Therefore, the reflectivity can be adjusted to a larger number of levels compared with the case of a single-layered liquid crystal layer.

When the transparent substrate 26a disposed between the two liquid crystal layers 23a and 23b has high retardation (phase difference), a light that has transmitted through the first liquid crystal layer 23a rotates and deflects inside the substrate to cause reduction in reflectivity or transmittance. Therefore, it is preferable for the transparent substrate 26a between the liquid crystal layers to have lower retardation. Specifically, the transparent substrate 26a is preferably formed of at least one member selected from polyether sulfone, polycarbonate, polyvinyl chloride, polyvinylidene chloride, and cyclic polyolefin, with polyether sulfone being particularly preferable.

The thickness of the transparent substrate 26a may be about 1 to 25 μm so as to suppress reduction in light transmittance or an increase in driving power of the electrostatic actuator 30 when the liquid crystal layers 23a and 23b are initialized.

The respective liquid crystal layers 23a and 23b are collectively initialized because a stress is simultaneously applied thereto by the electrostatic actuator 30. However, it may be so structured that an electrostatic actuator is provided for each liquid crystal layer, and each liquid crystal layer is separately pressurized for initialization. When such a structure is formed, the substrate and the electrode of the electrostatic actuator to be disposed between the liquid crystal layers 23a and 23b may be formed of a material having light transmittance.

Third Exemplary Embodiment

Figure 7:
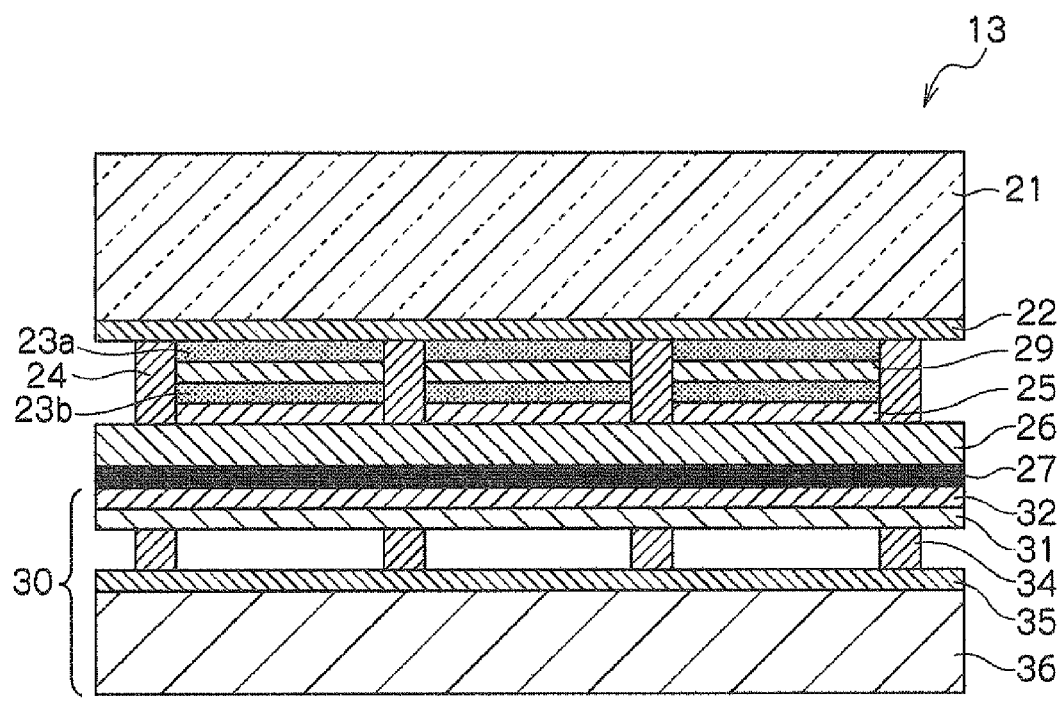
FIG. 7 is a schematic configuration diagram illustrating the structure of a liquid crystal display device according to a third exemplary embodiment.

FIG. 7 illustrates a liquid crystal display device according to a third exemplary embodiment. In a liquid crystal display device 13 according to this exemplary embodiment, the first liquid crystal layer 23a and the second liquid crystal layer 23b are disposed one on the other with a light-transmitting film 29 therebetween. One of the first and second liquid crystal layers 23a and 23b is a levorotatory liquid crystal layer and the other one thereof is a dextrorotatory liquid crystal layer. The respective liquid crystal layers 23a and 23b are disposed between the electrodes 22 and 25, and are simultaneously driven. The structure of the electrostatic actuator 30 is the same as that of the first exemplary embodiment. A stress is simultaneously applied to the two liquid crystal layers 23a and 23b, and they are collectively reset.

In the liquid crystal display device 13 according to this exemplary embodiment, the two liquid crystal layers 23a and 23b are commonly disposed between the electrodes 22 and 25 and simultaneously driven. Therefore, the driving voltage becomes higher than that of the liquid crystal display device 12 according to the second exemplary embodiment. However, since no electrode is disposed between the two liquid crystal layers 23a and 23b, the light transmittance becomes high and the contrast can be further improved.

Fourth Exemplary Embodiment

Figure 8:
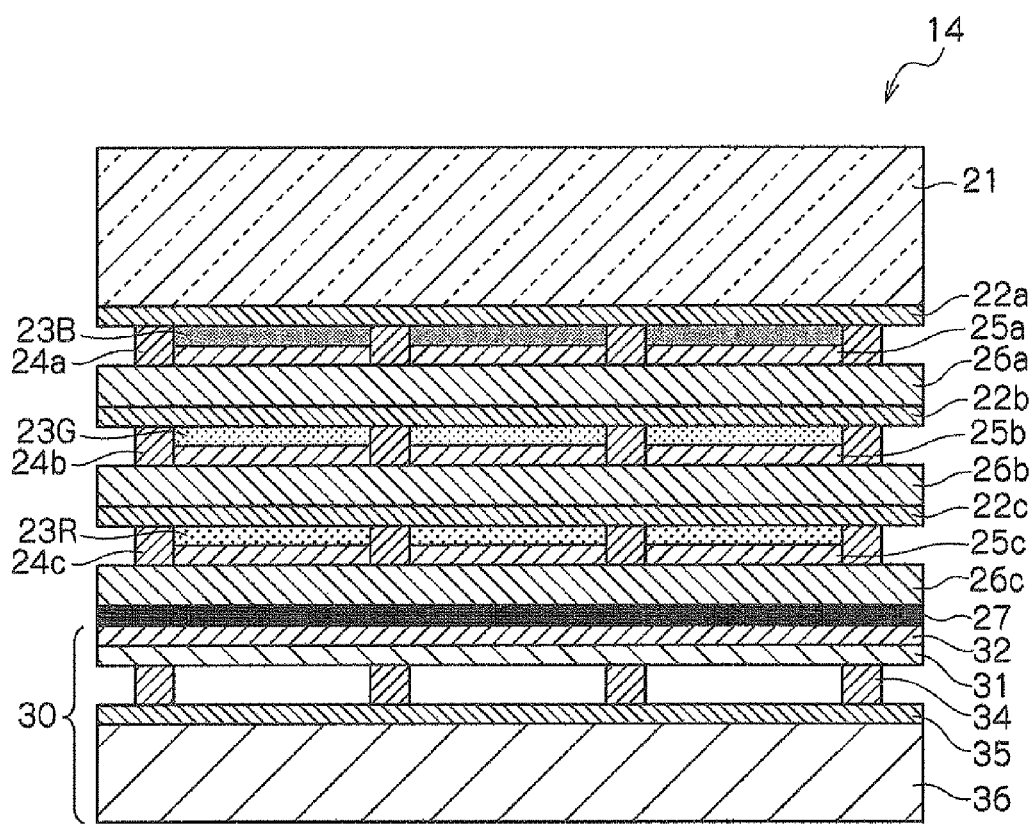
FIG. 8 is a schematic configuration diagram illustrating the structure of a liquid crystal display device according to a fourth exemplary embodiment.

FIG. 8 illustrates a liquid crystal display device according to a fourth exemplary embodiment. In the liquid crystal display device 14 according to this exemplary embodiment, three liquid crystal layers 23B, 23G, and 23R that selectively reflect lights (blue, green, or red) having mutually different wavelengths are disposed one on the other in the liquid crystal display medium. The transparent substrates 26a and 26b are provided between the liquid crystal layers 23B and 23G, and between the liquid crystal layers 23G and 23R respectively, and a substrate 26c is provided in contact with the electrode 25c at a side opposite to the liquid crystal layer 23R. Similarly as in the second exemplary embodiment, the respective liquid crystal layers 23B, 23G, and 23R are sandwiched between the electrodes 22a and 25a, between the electrodes 22b and 25b, and between the electrodes 22c and 25c, respectively, which separately drive the corresponding liquid crystal layer and is divided by partition walls 24a, 24b, and 24c, respectively. The display color of each of the liquid crystal layers 23B, 23G, and 23R depends on the helical pitch of the cholesteric liquid crystal. Therefore, the proportions of a nematic liquid crystal and a chiral agent may be adjusted so that the center wavelengths of the selective reflection of the liquid crystal layers 23B, 23G, and 23R are, for example 400 nm to 500 nm (blue), 500 nm to 600 nm (green), or 600 nm to 700 nm (red), respectively.

When a color display is performed as described above, a filter or a light absorption layer may be formed at one side of each of the liquid crystal layers 23B, 23G, and 23R, as required. When the display surface is viewed from an oblique direction, the wavelength of light to be reflected by each liquid crystal layer is shifted and thus the display appears in a different color in some cases. In particular, in the liquid crystal layer that reflects light having a red wavelength, the reflected wavelength is noticeably shifted, and the reflected light is shifted to a short wavelength side (a so-called blue shift), which makes it difficult to see a display. The blue shift is suppressed by, for example, providing a red filter between the liquid crystal layer 23G that reflects a green light and the liquid crystal layer 23R that reflects a red light.

For example, PD400R•FX1 manufactured by Hitachi Chemical Co., Ltd. is used as a red filter, OPTOMER SS2191 manufactured by JSR Corporation or Kayaset Yellow K-CL (1 wt %) manufactured by Nippon Kayaku Co., Ltd., is used as a yellow filter, and OPTOMER SS2191 manufactured by JSR Corporation/Kayaset Orange A-N (1 wt %) manufactured by Nippon Kayaku Co., Ltd., is used as a filter for a yellow reflective layer.

In the liquid crystal display device 14 according to this exemplary embodiment, the voltage to be applied to each of the liquid crystal layers 23B, 23G, and 23R can be independently controlled, and thus the orientation, i.e., reflection/transmission state, of each of the liquid crystal layers 23B, 23G, and 23R is independently controlled, whereby a full color display can be achieved. Also in this exemplary embodiment, the electrostatic actuator may be provided for each of the liquid crystal layer 23B and 23G and 23R, and separate initialization for each liquid crystal layer may be performed.

The selective reflection wavelength of each liquid crystal layer is not limited to the three colors mentioned above. A structure in which two liquid crystal layers that selectively reflect lights having mutually different wavelengths are superposed each other or a structure in which four or more such liquid crystal layers are superposed each other may be acceptable.

EXAMPLES

Hereinafter, the invention will be explained with reference to the following Examples.

<Production of Liquid Crystal Display Medium>

—Formation of Electrode—

Two polyether sulfone (PES) films (manufactured by Sumitomo Bakelite Co., Ltd., 100 μm in thickness) each having an ITO film (100 Ω/sq.) formed at one side are prepared. Each ITO film is patterned so that five 1 cm-wide strip electrodes are formed parallel to each other at intervals of 1 mm. To a side of one PES film opposite to the ITO film side, a black resin solution (BKR105, manufactured by Nippon Kayaku Co., Ltd.) is applied, and then dried to form a light absorption layer.

—Formation of Orientation Film—

SE7511L (for vertical orientation, manufactured by Nissan Chemical Company) is diluted 10-fold with ethyl cellosolve. The solution is spin-coated to a surface of each substrate on which the ITO electrode is formed, and then heated to form a vertical orientation film.

—Formation of Rib—

To the orientation film formed on one of the substrates, a negative resist for rib KI1000-V10 (manufactured by Hitachi Chemical Co., Ltd., 4 μm in thickness) is spin-coated. The resist is then exposed to light through a photomask, and then developed. Thus, a rib pattern is formed in which 1 mm-wide walls are disposed at intervals of 1 cm in both of the length and width directions.

—Formation of Liquid Crystal Layer—

The PES film on which the rib is formed and the other film on which the orientation film is formed are placed to face each other so that the strip electrodes formed on one film intersects with the strip electrodes formed on the other film at right angles. Then, a liquid crystal composition is laminated between the films. The peripheries of the two substrates are bonded to each other via a UV curing resin, and then subjected to UV curing.

As the liquid crystal, E44 (host nematic liquid crystal, manufactured by Merck & Co., Inc.) is used. As chiral agents, R-811 and R-1011 (manufactured by Merck & Co., Inc.) are used. The mixing ratio thereof is "R-811/R-1011=4/1". The mixing ratio of the chiral agent to the total liquid crystal composition for each color is as follows: 23 wt % in the case of blue (440 nm), 20.2 wt % in the case of green (520 nm), and 16.8 wt % in the case of red (610 nm), for example.

<Production of Electrostatic Actuator>

—Formation of Electrode—
Aluminum is vapor-deposited to one side of a 250 μm-thick PES film.
—Formation of Rib—
Next, a rib (thickness: 5 μm) is formed on the Al film using SU-8 (epoxy resin, manufacutured by Micro Chem). Through the process, the same rib pattern as in the liquid crystal display medium is formed using the photomask used for the formation of the rib in the liquid crystal display medium.
—Bonding of Films—
Next, aluminum is vapor-deposited to a 12 μm thick saran resin (vinylidene chloride resin) film to form an Al film. Then, the saran resin film and the PBS film are bonded to each other so that a saran resin surface faces at the rib side of the PES film. Thus, an electrostatic actuator is produced.
<Integration of Liquid Crystal Display Medium and Electrostatic Actuator>

The substrate of the liquid crystal display medium and the substrate of the electrostatic actuator are bonded to each other by lamination so that the optical absorption layer of the liquid crystal display medium contacts the Al film formed on the saran resin film of the electrostatic actuator. Thus, a liquid crystal display device having the structure as shown in FIG. 3 is produced. The liquid crystal display device is able to display an image by driving the electrostatic actuator for initialization (formation of the planar orientation) at a driving voltage of about 5 Hz and about 50 V and by orientating the liquid crystal to the focal conic orientation at a driving voltage of about 50 Hz and about 23 V.

Figure 9:
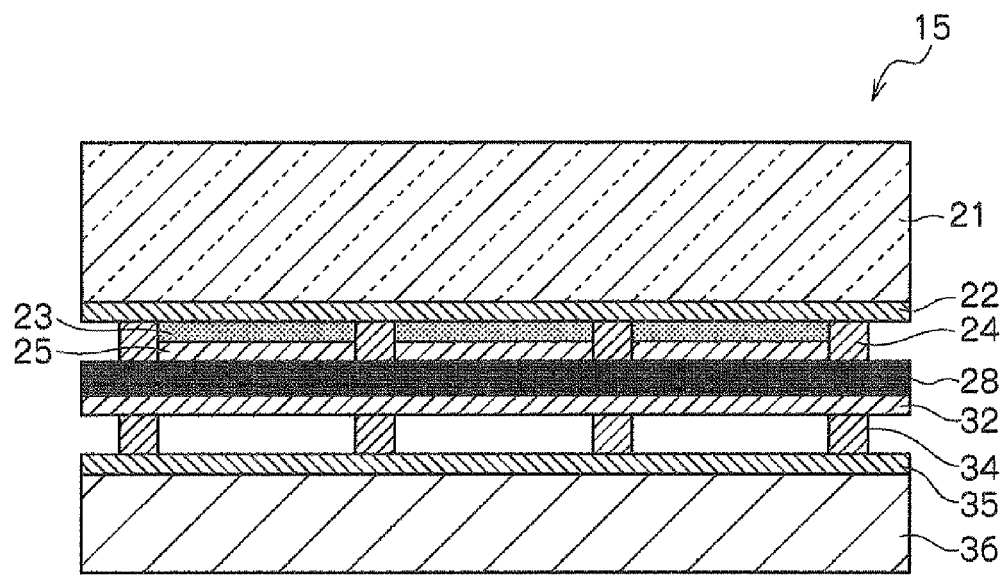
FIG. 9 is a schematic configuration diagram illustrating the structure of a liquid crystal display device according to a fifth exemplary embodiment.

The present invention is not limited to the above-described Exemplary Embodiments and Examples, and may be suitably changed. For example, in the above-described Exemplary Embodiments and Examples, the liquid crystal display medium and the electrostatic actuator are separately produced, and then bonded to each other to obtain a liquid crystal display device. However, for example, as shown in FIG. 9, a liquid crystal display device 15 in which the liquid crystal display medium and the electrostatic actuator are integrated via the same substrate 28 may be acceptable. For example, a substrate on which a light absorption layer has been formed or a substrate 28 having light absorption properties may be used, and the electrode 25 of the liquid crystal display medium may be formed at one surface and the electrode 32 of the electrostatic actuator may be formed at the other surface. With the liquid crystal display device having such a structure, the thickness and the weight can be further reduced and a stress by the electrostatic actuator is easily transmitted to the liquid crystal layer 23, whereby resetting in lump is further facilitated.

Figure 10:
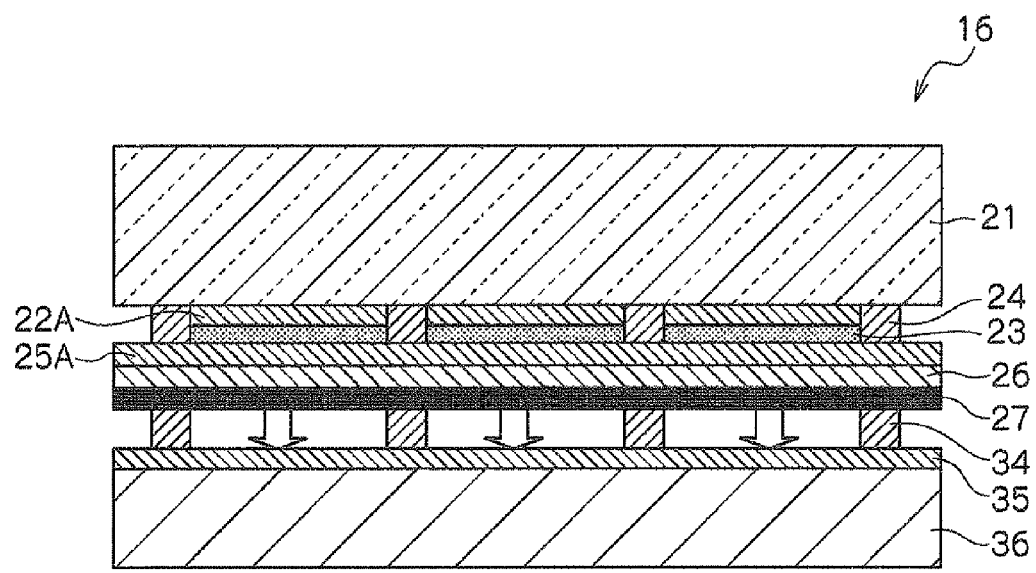
FIG. 10 is a schematic configuration diagram illustrating the structure of a liquid crystal display device according to a sixth exemplary embodiment.

The liquid crystal display medium and the electrostatic actuator may share a common electrode. For example, as shown in FIG. 10, active pixel electrodes 22A divided by the partition walls 24 in a matrix may be provided on the display-side substrate 21 of the liquid crystal display medium, and a common substrate 26 on which a common electrode 25A is provided at the surface at the liquid crystal display medium side is provided between the liquid crystal display medium and the electrostatic actuator. The common electrode 25A may be provided at the electrostatic actuator side of the common substrate 26. Also with the liquid crystal display device 16 according to this exemplary embodiment, an image is displayed when a voltage is applied to a specific area according to image data through the electrodes 22A and 25A to change the orientation of the liquid crystal layer 23, after the state of the liquid crystal layer 23 is changed to the planar state by the application of a stress to the liquid crystal layer 23 of the liquid crystal display medium due to the deformation of the substrate 26 at the center by the application of a voltage between the electrodes 25A and 35. Then, with the liquid crystal display device 16 according to this exemplary embodiment, the image is held under no power supply, except when the image is written. Therefore, an image display at a low voltage can be achieved. A liquid crystal display device that achieves a multicolor display can be provided thereby.

What is claimed is:

1. A liquid crystal display device, comprising:
a liquid crystal display medium that has a cholesteric liquid crystal layer disposed between a pair of electrodes disposed facing each other and that displays an image by reflecting or transmitting outside light according to the orientation of the liquid crystal layer; and
an electrostatic actuator disposed at a side opposite to a display surface of the cholesteric liquid crystal display medium,
wherein the liquid crystal display device displays an image by changing the orientation of the liquid crystal layer by application of a voltage to a specific area of the liquid crystal display medium through the pair of electrodes according to image data, after the orientation of the liquid crystal layer is changed to a planar state by applying a pressure to the liquid crystal display medium by the electrostatic actuator.

2. The liquid crystal display device according to claim 1, wherein the cholesteric liquid crystal display medium has a partition wall between the electrodes that divides the liquid crystal layer, and the electrostatic actuator has a partition wall at a position corresponding to the partition wall of the liquid crystal display medium.

3. The liquid crystal display device according to claim 1, wherein the liquid crystal display medium has a multilayer structure comprising a plurality of liquid crystal layers that selectively reflect light of different wavelength regions.

4. The liquid crystal display device according to claim 1, wherein, in the liquid crystal display medium, two substrates each having an electrode formed at one side are disposed facing each other and the cholesteric liquid crystal layer is disposed between the pair of electrodes.

5. The liquid crystal display device according to claim 1, wherein a substrate is provided in contact with the electrostatic actuator at a non-display side, and the substrate has a light absorption layer formed thereon which absorbs light that has been transmitted through the liquid crystal layer.

6. The liquid crystal display device according to claim 5, wherein the thickness of the substrate at the non-display side is a thickness required for a stress caused by the electrostatic actuator to be transmitted to the liquid crystal layer.

7. The liquid crystal display device according to claim 6, wherein the thickness of the substrate at the non-display side is from about 25 μm to about 200 μm.

8. The liquid crystal display device according to claim 1, wherein the electrostatic actuator comprises an upper substrate and a back substrate, and the upper substrate is configured to move up or down according to whether or not a voltage is applied between both the electrodes of the electrostatic actuator.

9. The liquid crystal display device according to claim 8, wherein the thickness of the upper substrate is from about 1 μm to about 25 μm.

10. The liquid crystal display device according to claim 8, wherein the thickness of the back substrate is from about 50 μm to about 2 mm.

11. The liquid crystal display device according to claim 1, wherein, in the liquid crystal display medium, a first liquid crystal layer and a second liquid crystal layer, one of which is levorotatory while the other of which is dextrorotatory, are superposed sandwiching a transparent substrate, each liquid crystal layer being disposed between a different pair of electrodes, and each liquid crystal layer being divided by a partition wall that has been subjected to pattern formation.

12. The liquid crystal display device according to claim 11, wherein the thickness of the transparent substrate is from about 1 μm to about 25 μm.

13. The liquid crystal display device according to claim 1, wherein, in the liquid crystal display medium, a first liquid crystal layer and a second liquid crystal layer, one of which is levorotatory while the other of which is dextrorotatory, are superposed sandwiching a light-transmitting film, the liquid crystal layers being disposed between the same pair of electrodes, and the liquid crystal layers being simultaneously driven.

14. The liquid crystal display device according to claim 1, wherein, in the liquid crystal display medium, three liquid crystal layers that selectively reflect light of different wavelength regions are superposed, transparent substrates are provided between the respective liquid crystal layers, each liquid crystal layer is sandwiched between electrodes that are independently driven, and each liquid crystal layer is divided by a partition wall.

15. The liquid crystal display device according to claim 1, wherein the liquid crystal display medium and the electrostatic actuator are integrated on the same substrate.

16. The liquid crystal display device according to claim 15, wherein a light absorption layer is formed at the substrate, or the substrate is a light absorbing substrate, an electrode of the liquid crystal display medium being formed at one side of the substrate, and an electrode of the electrostatic actuator being formed at the other side of the substrate.

17. The liquid crystal display device according to claim 1, wherein a substrate is provided at a display side of the liquid crystal display medium, an active pixel electrode divided by a matrix partition wall is provided on the substrate, a common substrate is provided between the liquid crystal display medium and the electrostatic actuator, and a common electrode is provided at a side of the liquid crystal display medium of the common substrate, or at a side of the electrostatic actuator of the common substrate.

* * * * *